United States Patent [19]

Okinoshima et al.

[11] Patent Number: 5,326,589
[45] Date of Patent: Jul. 5, 1994

[54] METHOD OF PROTECTING ELECTRONIC OR ELECTRIC PART

[75] Inventors: Hiroshige Okinoshima; Toshio Shiobara; Tsutomu Kashiwagi, all of Annaka, Japan

[73] Assignee: Shin-Etsu Chemical Co., Ltd, Tokyo, Japan

[21] Appl. No.: 13,409

[22] Filed: Feb. 4, 1993

Related U.S. Application Data

[63] Continuation-in-part of Ser. No. 823,477, Jan. 22, 1992, abandoned.

[30] Foreign Application Priority Data

Jan. 22, 1991 [JP] Japan ................................. 3-21650

[51] Int. Cl.$^5$ ............................................. B05D 5/12
[52] U.S. Cl. ..................................... 427/79; 427/96;
427/102; 427/126.3; 427/126.4; 427/126.6
[58] Field of Search ............... 427/126.3, 126.4, 126.6, 427/79, 96, 102; 524/588

[56] References Cited

U.S. PATENT DOCUMENTS 4,382,057  5/1983  Tolentino .
4,705,762 11/1987  Ota et al. .............................. 501/87
4,880,882 11/1989  Morita et al. ....................... 525/446
5,051,465  9/1991  Yoshida et al. ..................... 524/588

FOREIGN PATENT DOCUMENTS 0234271  2/1987  European Pat. Off. .
0284340  9/1988  European Pat. Off. .
0456557 11/1991  European Pat. Off. .
3258852  8/1992  European Pat. Off. .

Primary Examiner—John C. Bleutge
Assistant Examiner—Mark D. Sweet
Attorney, Agent, or Firm—Birch, Stewart Kolasch & Birch

[57] ABSTRACT

The invention provides a method of protecting an electronic or electric part by coating the part with a silicone rubber composition comprising an organopolysiloxane, an organohydrogenpolysiloxane, an addition reaction catalyst, and a filler. When metal oxide fine particles obtained by deflagration of metal powder dust in an oxygen-containing atmosphere are blended as the filler, the composition has sufficient purity to cover electronic and electric parts and cured products of the composition are improved in electrical properties and heat resistance, thereby protecting the electronic or electric part.

11 Claims, No Drawings

METHOD OF PROTECTING ELECTRONIC OR ELECTRIC PART

This application is a continuation-in-part of application Ser. No. 07/823,477, filed on Jan. 22, 1992, now abandoned, the entire contents of which are hereby incorporated by reference.

The present invention relates to a method of protecting an electronic or electric part.

BACKGROUND OF THE INVENTION

Conventional silicone rubber compositions were typically loaded with such fillers as crystalline silica and fused silica. Since these silica fillers contained ionic impurities, they had a purity problem for utility in the silicone rubber compositions intended for forming protective coats on electronic and electric parts. Further, silicone rubber compositions could not be loaded with large amounts of silica fillers partly because silica tend to invite a lowering of flow due to its configurational factor, imposing a certain limit on the loading and partly because separation often occurs between the silica filler and the resin component due to relatively large particle size. For these reasons, the conventional silicone rubber compositions were not regarded optimum as protective coating compositions for electronic and electric parts.

SUMMARY OF THE INVENTION

An object of the present invention is to provide a method of protecting an electronic or electric part by coating the electronic or electric part with a silicone rubber composition which is free of undesirable impurities and well flowing, which cures into products having improved electrical and mechanical properties, heat resistance, and humidity resistance, and which is thus optimum as a protective coating composition for an electronic or electric part.

The inventors have found that metal oxide fine particles obtained by deflagration of metal powder dust in an oxygen-containing atmosphere are highly pure due to its minimal content of ionic impurities. They are fine particles of spherical or polyhedral shape ensuring good flowing nature. Then they can be added to silicone rubber compositions in larger amounts. In fact, silicone rubber compositions loaded with such metal oxide fine particles manifest favorable flow and high purity, and cured products thereof have improved electrical and mechanical properties, a low coefficient of thermal expansion, heat resistance, and humidity resistance. Especially, the hardness of the cured product hardly changes even after heating it at 200° to 300° C. for 50 to 100 hours. The loaded silicone rubber compositions are suited for forming protective coats on electronic and electric parts for keeping the parts reliable.

Therefore, the present invention provides a method of protecting an electronic or electric part comprising coating the electronic or electric part with a silicone rubber composition having blended therein a filler in the form of metal oxide fine particles obtained by deflagration of metal powder dust in an oxygen-containing atmosphere, and curing the composition.

DETAILED DESCRIPTION OF THE INVENTION

The silicone rubber composition used for the method of the present invention is comprised of a silicone rubber base and a specific filler. The silicone rubber base is conventionally defined as including an organopolysiloxane, an organohydrogenpolysiloxane, and an addition reaction catalyst.

A first component which constitutes the silicone rubber composition is an organopolysiloxane. Preferred are vinyl-containing diorganopolysiloxanes having at least two $CH_2=CH-Si\equiv$ bonds in their molecule. In the vinyl-containing diorganopolysiloxanes, the vinyl groups may be attached to the backbone only at the ends or at the ends and an intermediate position. The vinyl-containing diorganopolysiloxanes are typically of the following formula (1):

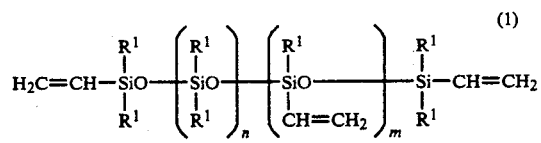

(1)

wherein $R^1$ is independently selected from substituted or unsubstituted monovalent hydrocarbon groups free of an aliphatic unsaturated bond, letter n is equal to 0 or a positive integer, and m is equal to 0 or a positive integer.

More particularly, substituents $R^1$, which may be identical or different, are selected from substituted or unsubstituted monovalent hydrocarbon groups free of an aliphatic unsaturated bond, preferably having 1 to 10 carbon atoms, more preferably 1 to 6 carbon atoms, for example, lower alkyl groups such as methyl, ethyl, propyl, and butyl groups; aryl groups such as phenyl, tolyl, xylyl, and benzyl groups; cycloalkyl groups such as a cyclohexyl group; and substituted ones of these groups in which some or all of the hydrogen atoms are replaced by halogen atoms, cyano groups or the like, such as chloromethyl, cyanoethyl, and 3,3,3-trifluoropropyl groups. Letter n is equal to 0 or a positive integer and m is equal to 0 or a positive integer, and preferably n and m are numbers meeting $0<n+m\leq 10,000$, more preferably $0<n+m \leq 2,000$ and $0<m/(n+m) \leq 0.2$.

Preferably, the diorganopolysiloxanes of formula (1) have a viscosity of 10 to 1,000,000 centistokes (cs) at 25° C.

A second component is an organohydrogenpolysiloxane which preferably has at least two hydrogen atoms directly attached to silicon atoms in its molecule. Preferred are organohydrogenpolysiloxanes of the following formula (2):

$$H_a R^2_b SiO_{(4-a-b)/s}$$ (2)

wherein $R^2$ is independently selected from substituted or unsubstituted monovalent hydrocarbon groups free of an aliphatic unsaturated bond, letters a and b are numbers meeting $0<a<2$, $1\leq b\leq 2$, and $2\leq a+b \leq 3$.

More particularly, substituents $R^2$, which may be identical or different, are selected from substituted or unsubstituted monovalent hydrocarbon groups free of an aliphatic unsaturated bond, preferably having 1 to 10 carbon atoms, more preferably 1 to 7 carbon atoms, for example, such as described for $R^1$, typically lower alkyl groups such as methyl and aryl groups such as phenyl. Letters a and b are numbers meeting $0<a<2$, $1<b<2$, and $2 \leq a+b \leq 3$, preferably numbers meeting $0.3 \leq a \leq 1$ and $2 \leq a+b \leq 2.7$.

These organohydrogenpolysiloxanes may be obtained either by hydrolysis of chlorosilanes such as $R^2SiHCl_2$, $R^2_3SiCl$, $R^2_2SiCl_2$, and $R^2_2SiHCl$, or by further equilibration of siloxanes resulting from such hydrolysis. Some illustrative examples are given below.

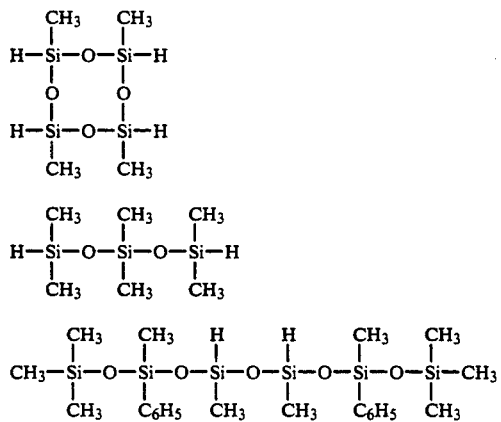

The second component or organohydrogenpolysiloxane is used in any desired amount, preferably in such an amount that there are available 1.5 to 4 hydrogen atoms from the organohydrogenpolysiloxane per vinyl group in the diorganopolysiloxane as the first component.

A third component is an addition reaction catalyst which is typically platinum or a platinum compound. Any of platinum catalysts commonly used in silicone rubber compositions of this type may be used insofar as it can catalyze the addition reaction between a silicon-attached vinyl group of the vinyl-containing organopolysiloxane as the first component and a silicon-attached hydrogen atom of the organohydrogenpolysiloxane as the second component. Examples of the platinum catalyst include elemental platinum, $H_2PtCl_6.nH_2O$, $NaHPtCl_6.nH_2O$, $KHPtCl_5.nH_2O$, $Na_2PtCl_5.nH_2O$, $K_2PtCl_5.nH_2O$, $PtCl_4.nH_2O$, $PtCl_2$, $Na_2PtCl_4.nH_2O$, and $H_2PtCl_4.nH_2O$. Also useful are complexes of these platinum compounds with hydrocarbons, alcohols, and vinyl-containing cyclic siloxane.

The addition reaction catalyst may be added in a catalytic amount. For example, platinum or a platinum compound is used in an amount of about 0.1 to 100 ppm of Pt based on the total weight of the first and second organopolysiloxane components.

According to the present invention, the silicone rubber base comprising the first to third components defined above is loaded with a specific filler in the form of metal oxide fine particles obtained by deflagration of metal powder dust in an oxygen-containing atmosphere. Then there is obtained a silicone rubber composition well suited in forming reliable protective coats on electronic and electric parts. The metal oxide fine particles may be produced by the method described in U.S. Pat. No. 4,705,762 or Japanese Patent Application Kokai No. 255602/1985, for example. The method involves charging a reactor with a reaction gas containing oxygen, dispersing metal powder in the reaction gas to create a dust cloud of high concentration, and igniting the cloud using a suitable ignition source such as arc, plasma and chemical flame, thereby incurring deflagration or rapid auto-combustion of metal powder. There results a cloud of metal oxide fine particles, which can be charged and collected by means of an electric precipitator. The reaction gas may consist of 20 to 100% by volume of oxygen and 80 to 0% by volume of an inert gas such as argon, helium and nitrogen gases.

It is desired that the metal powder subject to deflagration have a particle size as small as possible, typically up to 400 μm, preferably up to 100 μm, more preferably 5 to 50 μm. The type of metal powder may be selected in accordance with the desired filler type form, for example, aluminum, silicon, manganese, niobium, zirconium, titanium, magnesium, and iron. Among others, aluminum, silicon, and zirconium are preferred since alumina, silica, mullite, and zirconium oxide are preferred fillers for silicone rubber compositions intended for the protective coating of electronic and electric parts.

A dust cloud of metal powder is preferably formed by introducing a reaction gas into the reactor with metal powder carried thereon. In this regard, the concentration of metal powder in the dust cloud is generally at least 20 g/m³, often at least 500 g/m³, most often at least 1,000 g/m³ of metal. The upper limit may be 50 kg/m³. A higher concentration of metal powder in the dust cloud is preferred for steady ignition.

When a dust cloud of metal powder is ignited, thermal energy is imparted to the surface of metal particles, the surface temperature of metal particles rises, and metal vapor spreads from the metal particle surface. The spreading metal vapor mixes with the reaction gas, generating igniting flames. As the metal vapor mixes with the reaction gas, ignition propagates in chain fashion. At this point, metal particles themselves burst and scatter, promoting flame propagation. At the end of deflagration, the metal oxide gas is spontaneously cooled while metal oxide fragments grow into fine particles of spherical or polyhedral shape having a mean particle size of 0.01 to 20 μm. It is to be noted that a mean particle size of 0.3 to 15 μm, more preferably 0.4 to 5 μm is advantageous as the filler for silicone rubber compositions. The specific surface area of the particles is preferably in the range of 5 to 15 m²/g. If the specific surface area is less than 5 m²/g, insufficient reinforcement effect may occur. If the specific surface area is more than 15 m²/g, the viscosity of the composition may become too high.

Since metal oxide fine particles resulting from deflagration are particles that have grown during the spontaneous cooling process, they are characterized by higher surface activity than conventional spherical particles which are fused and sphere at high temperatures. For example, spherical silica fine particles synthesized by deflagration have a multiplicity of active silanol groups on the surface.

In order to further enhance the interfacial bonding between metal oxide fine particles and silicone resin, it is desired that the metal oxide fine particles be directly surface treated with an organic silicon compound. Such surface treatment is advantageously carried out by using the organic silicon compound having the following formula (3) or (4) and injecting it into the reactor immediately after metal oxide fine particles are produced therein by deflagration as mentioned above. Since the metal oxide fine particles are then quite active on their surface, more effective surface treatment is accomplished.

$$R^3{}_n Si(OR^4)_{4-n} \qquad (3)$$

wherein $R^3$ represents a monovalent organic group having 1 to 20, preferably 1 to 12 carbon atoms and containing an epoxy group, acryl group, methacryl group, amino group or mercapto group, or an unsubstituted or substituted, unsaturated or saturated monovalent hydrocarbon group having 1 to 10 carbon atoms, $R^4$ represents a lower alkyl group or alkoxyalkyl group having 1 to 6 carbon atoms, and n is an integer of 1 to 3.

$$R^5{}_3SiNHSiR^5{}_3 \tag{4}$$

wherein $R^5$ represents an unsubstituted or substituted, unsaturated or saturated monovalent hydrocarbon group having 1 to 10 carbon atoms, $R^5$'s are identical or different.

Examples of the organic silicon compound used in surface treatment are given below. These compounds or hydrolysates thereof may be used alone or in admixture of two or more.

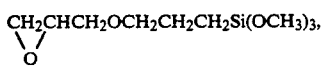

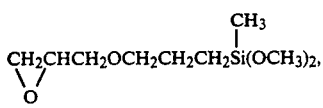

$NH_2CH_2CH_2CH_2Si(OCH_3)_3$,

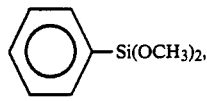

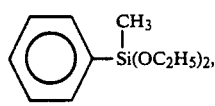

$(CH_3)_3SiHNSi(CH_3)_3$, $CH_3Si(OCH_3)_3$, $(CH_3)_2Si(OCH_3)_2$, $HSCH_2CH_2CH_2Si(OCH_3)_3$, $CH_3(CH_2)_7Si(OCH_3)_3$,

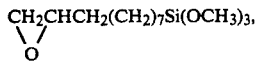

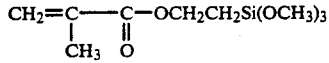

The amount of the organic silicon compound used is dictated by the specific surface area of metal oxide fine particles and the molecular occupying area of the organic silicon compound, and preferably ranges from about 0.05 to 5%, more preferably from about 0.1 to 1% by weight based on the weight of the metal oxide fine particles.

Upon injection, the organic silicon compound can be atomized with or without premixing with pure water, desirably pure water containing a strong base such as DBU.

Preferably, the metal oxide fine particles resulting from deflagration are blended in an amount of about 10 to 300 parts, more preferably about 50 to 200 parts by weight per 100 parts by weight of the silicone rubber base consisting essentially of the first to third components. Less than 10 parts of the filler would be ineffective for its purpose whereas more than 300 parts of the filler would reduce the flow of the silicone rubber composition during coating.

In addition to the metal oxide fine particles mentioned above, the silicone rubber composition may contain another filler or fillers, for example, reinforcing and non-reinforcing inorganic fillers, if desired, insofar as the benefits of the invention are not lost. The reinforcing inorganic fillers include fumed silica and fumed titanium dioxide, and the extending inorganic fillers include conventional fillers used in silicone rubber compositions of this type, for example, such as calcium carbonate, calcium silicate, titanium dioxide, ferric oxide and carbon black. Of course, the inorganic filler need not be blended in the silicone rubber composition of the invention. The inorganic filler is generally blended in an amount of from 0 to about 200 parts by weight per 100 parts by weight of the entire composition excluding the inorganic filler.

Also if desired, the silicone rubber composition may contain another additional component or components. For example, an epoxy-containing polysiloxane compound and ester siloxane compound may be blended for the purpose of increasing adhesion.

The silicone rubber composition may be formulated as a two-part composition in which the components are divided into two parts to be combined for curing as often the case with conventional silicone rubber compositions. Alternatively, a one-part composition is possible if a minor amount of a curing retarder such as acetylene alcohol is added.

In the present invention, an electronic or electric part is coated with the silicone rubber composition having blended therein the filler in the form of metal oxide fine particles obtained by deflagration of metal powder dust in an oxygen-containing atmosphere.

Examples of the electronic and electric parts include transistors, diodes, thyristors, ICs, HICs, LSIs, chips, condensers, transducers, resistors, etc.

The method for forming the coating layer of the silicone rubber composition on the electronic or electric part may be conducted by using an applicator, dispenser and the like.

The coating thickness of the silicone rubber composition may be 10 to 1,000 μm, preferably 20 to 200 μm, although it is not limited thereto.

Then, the silicone rubber composition coating layer is cured to form a protective coat on the electronic or electric part. The curing is conducted preferably at 60° to 150° C. for 1 to 10 hours. The after-curing at 150° to 250° C. for 1 to 10 hours is recommended.

EXAMPLE

Examples of the present invention are given below by way of illustration and not by way of limitation. All parts are by weight.

EXAMPLE 1 and COMPARATIVE EXAMPLE 1

A silicone rubber composition was prepared by blending and thoroughly agitating 100 parts of a dimethylpolysiloxane having two methylvinylsiloxane units in a molecule (viscosity 1,000 cs), 1.5 parts of a methylhydrogensiloxane having 1.0 mol/100 g of ≡SiH bond, 0.05 parts of an octyl alcohol modified solution of chloroplatinic acid (platinum concentration 2% by weight), 100 parts of silica particles synthesized according to the method of U.S. Pat. No. 4,705,762 or Japanese Patent Application Kokai No. 255602/1985 by deflagration of metallic silicon (mean particle size 1 μm, specific surface area 8 m$^2$/g, designated Silica No. 1), and 1.0 part of an epoxy group-containing siloxane (obtained by partially adding 1 mol of allylglycidyl ether to 1 mol of 1,3,5,7-tetramethylcyclotetrasiloxane ). The composition was heated at 150° C. for 4 hours in a mold cavity of 150 mm×100 mm×2 mm thick, obtaining a cured product (Example 1).

A silicone rubber composition was prepared by the same procedure as above except that commercially available fused silica (mean particle size 5 μm, particle size distribution 0.1 to 10 μm, specific surface area 7 m$^2$/g designated Silica No. 2) was used instead of Silica No. 1. A cured product was obtained therefrom (Comparative Example 1).

The silicone rubber compositions were measured for viscosity and electrical conductivity of extracted water, and the physical properties of the cured products were examined.

The results are shown in Table 1.

TABLE 1

|  | Example 1 | Comparative Example 1 |
| --- | --- | --- |
| Composition |  |  |
| Viscosity, poise | 60 | 70 |
| Conductivity of extracted water, μs/cm | 2.0 | 6.0 |
| Cured product (150° C./4 hours) |  |  |
| Specific gravity | 1.30 | 1.30 |
| Hardness, JIS-A | 42 | 47 |
| Elongation, % | 210 | 130 |
| Tensile strength, kg/cm$^2$ | 22 | 20 |
| Volume resistivity, Ω-cm | 2.0 × 10$^{15}$ | 2.0 × 10$^{15}$ |
| Dielectric strength, kV/mm | 26.0 | 25.0 |
| Dielectric constant @50 Hz | 3.06 | 3.27 |
| Dielectric dissipation factor @50 Hz | 6.0 × 10$^{-4}$ | 1.0 × 10$^{-3}$ |
| Heat resistance at 250° C. |  |  |
| Initial hardness | 42 | 47 |
| Hardness after 72 hours | 42 | 57 |

EXAMPLE 2 and COMPARATIVE EXAMPLE 2

A silicone rubber composition was prepared by blending and thoroughly agitating 100 parts of a dimethylpolysiloxane having two methylvinylsiloxane units in a molecule (viscosity 1,000 cs ), 1.5 parts of a methylhydrogensiloxane having 1.0 mol/100 g of ≡SiH bond, 0.05 parts of an octyl alcohol modified solution of chloroplatinic acid (platinum concentration 2% by weight ), 200 parts of Silica No. 1, and 1.0 part of an epoxy group-containing siloxane (obtained by partially adding 1 mol of allylglycidyl ether to 1 mol of 1,3,5,7 -tetramethylcyclotetrasiloxane). A cured product was obtained therefrom as in Example 1 (Example 2 ).

A silicone rubber composition was prepared by the same procedure as above except that Silica No. 2 was used instead of Silica No. 1. A cured product was obtained therefrom (Comparative Example 2 ).

The viscosity of the silicone rubber compositions and the physical properties of the cured products were examined.

The results are shown in Table 2.

TABLE 2

|  | Example 2 | Comparative Example 2 |
| --- | --- | --- |
| Composition |  |  |
| Viscosity, poise | 635 | 1200 |
| Cured product (150° C./4 hours) |  |  |
| Specific gravity | 1.54 | 1.54 |
| Hardness, JIS-A | 65 | 85 |
| Elongation, % | 80 | 50 |
| Tensile strength, kg/cm$^2$ | 39 | 50 |
| Volume resistivity, Ω-cm | 2.0 × 10$^{15}$ | 2.0 × 10$^{15}$ |
| Dielectric strength, kV/mm | 25.6 | 26.0 |
| Dielectric constant @50 Hz | 3.10 | 3.17 |
| Dielectric dissipation factor @50 Hz | 6.0 × 10$^{-4}$ | 4.0 × 10$^{-3}$ |

As seen from Tables 1 and 2, silicone rubber compositions filled with metal oxide fine particles according to the invention (Examples 1 and 2) show smooth flow and provide cured products having good electrical and mechanical properties, heat resistance, and humidity resistance as compared with those compositions filled with commercially available fused silica (Comparative Examples 1 and 2 ).

The silicone rubber composition filled with metal oxide fine particles obtained by deflagration of metal powder dust and having high surface activity has high purity and smooth flow and cures to products having sufficient electrical and mechanical properties, heat resistance, and humidity resistance to form protective coats on electronic and electric parts. Electronic and electric parts coated with the composition in cured form are thus resistant against heat and humidity and remain reliable.

Although some preferred embodiments have been described, many modifications and variations may be made thereto in the light of the above teachings. It is therefore to be understood that within the scope of the appended claims, the invention may be practiced otherwise than as specifically described.

We claim:

1. A method of protecting an electronic or electric part which comprises
   coating the electronic or electric part with a silicone rubber composition comprising a silicone rubber base and a filler which comprises metal oxide fine particles obtained by deflagration of metal powder dust in an oxygen-containing atmosphere and having a mean particle size of 0.01 to 20 μm, and a specific surface area of 5 to 15 m$^2$/g; and
   curing the silicone rubber composition to form a protective coat on the electronic or electric part.

2. The method of claim 1 wherein said silicone rubber base includes an organopolysiloxane, an organohydrogenpolysiloxane, and an addition reaction catalyst.

3. The method of claim 1 wherein the metal powder is selected from the group consisting of aluminum, silicon, manganese, niobium, zirconium, titanium, magnesium, and iron.

4. The method of claim 3 wherein the metal powder is selected from the group consisting of aluminum, silicon, and zirconium.

5. The method of claim 1 wherein the metal oxide fine particles are surface treated with an organic silicon compound.

6. The method of claim 1 wherein the protective coat does not substantially change its hardness after heating it at 200° to 300° C. for 50 to 100 hours.

7. The method of claim 1, wherein said electronic or electric part is selected from the group consisting of transistors, diodes, thyristors, ICs, HICs, LSIs, chips, condensers, transducers, and resistors.

8. The method of claim 5, wherein said organic silicon compound is represented by formula (3) or (4):

$$R^3{}_n Si(OR^4)_{4-n} \qquad (3)$$

wherein $R^3$ represents a monovalent organic group having 1 to 20 carbon atoms and containing an epoxy group, acryl group, methacryl group, amino group or mercapto group, or an unsubstituted or substituted, unsaturated or saturated monovalent hydrocarbon group having 1 to 10 carbon atoms, $R^4$ represents a lower alkyl group or alkoxyalkyl group having 1 to 6 carbon atoms, and n is an integer of 1 to 3, $$R^5{}_3 SiNHSiR^5{}_3 \qquad (4)$$

wherein $R^5$ represents an unsubstituted or substituted, unsaturated or saturated monovalent hydrocarbon group having 1 to 10 carbon atoms, provided that the $R^5$'s may be the same or different.

9. The method of claim 1 wherein said metal oxide fine particles are contained in an amount of about 10 to 300 parts by weight per 100 parts by weight of said silicone rubber base.

10. The method of claim 1 wherein said metal oxide fine particles are contained in an amount of about 50 to 200 parts by weight per 100 parts by weight of said silicone rubber base.

11. The method of claim 1 wherein said metal oxide fine particles have a mean particle size of 0.4 to 5 μm.

* * * * *